C. W. DAVIS.
TERMINAL STRUCTURE FOR ELECTRICAL CABLES.
APPLICATION FILED JULY 1, 1909. RENEWED FEB. 24, 1911.

1,005,003.

Patented Oct. 3, 1911.

WITNESSES:

INVENTOR

UNITED STATES PATENT OFFICE.

CHARLES W. DAVIS, OF EDGEWORTH, PENNSYLVANIA, ASSIGNOR TO STANDARD UNDERGROUND CABLE COMPANY, OF PITTSBURGH, PENNSYLVANIA, A CORPORATION OF PENNSYLVANIA.

TERMINAL STRUCTURE FOR ELECTRICAL CABLES.

1,005,003.  Specification of Letters Patent.  Patented Oct. 3, 1911.

Application filed July 1, 1909, Serial No. 505,380. Renewed February 24, 1911. Serial No. 610,603.

*To all whom it may concern:*

Be it known that I, CHARLES W. DAVIS, residing at Edgeworth, in the county of Allegheny and State of Pennsylvania, a citizen of the United States, have invented or discovered certain new and useful Improvements in Terminal Structures for Electrical Cables, of which improvements the following is a specification.

My invention relates to improvements for terminal structures for multiple-conductor metal-sheathed cables, and its object is simplicity of structure, together with efficiency in service.

Figure 1:
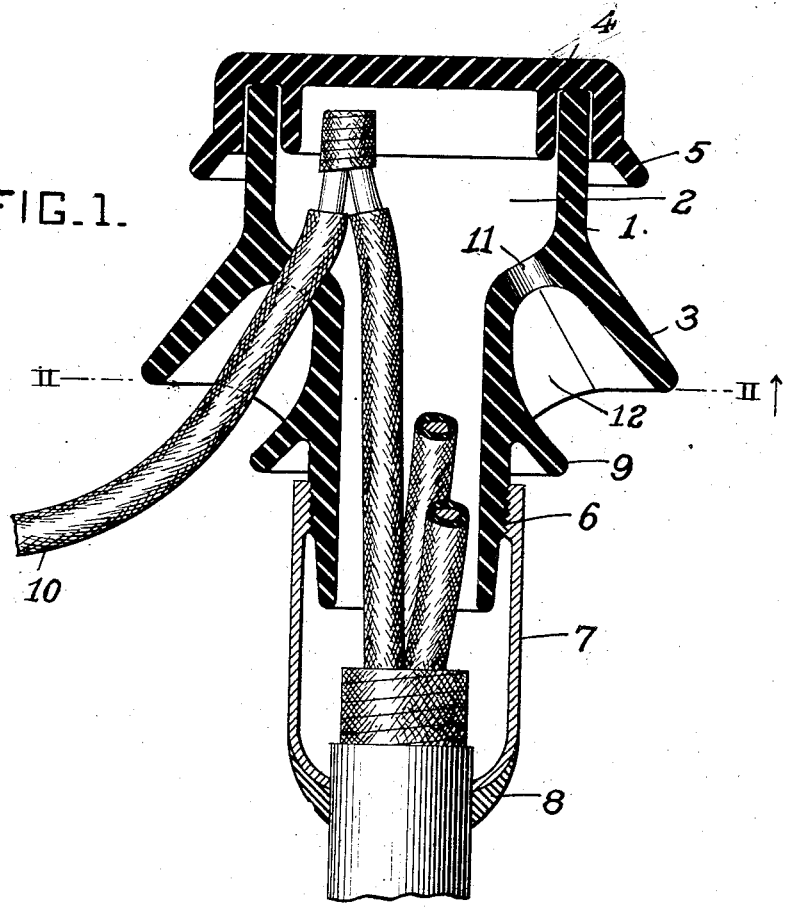
Figure 2:
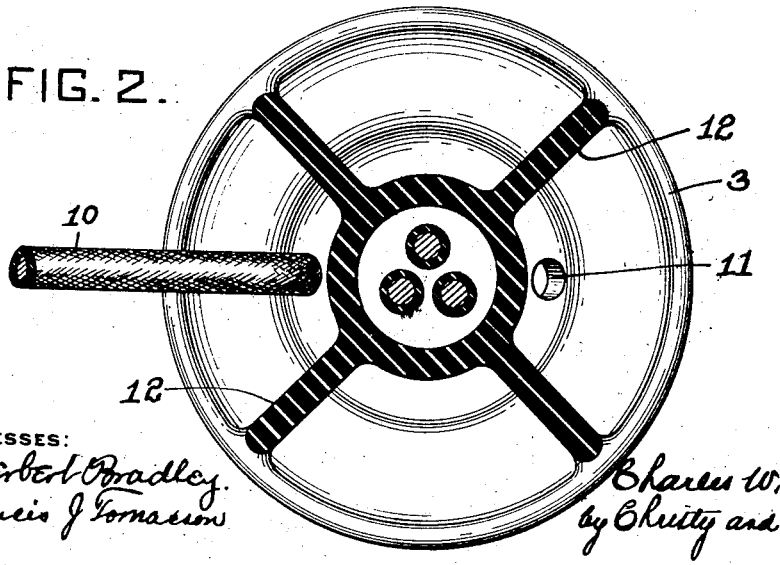

In the accompanying drawings which form part of this specification Figure 1 is a vertical sectional view of a terminal structure embodying my present invention with the cable and the leads-out in place and connections made, and Fig. 2 is a transverse section on the line II—II of Fig. 1.

Parts which are repeated in the several figures have the same reference numerals in each case.

This terminal structure consists essentially of a body portion 1 formed of insulating material and of substantially cylindrical shape with an inner axial cavity open from end to end, the cavity being at one end of suitable size for the reception of the cable structure, and being preferably enlarged at the opposite end to form the chamber 2. Means are provided at the smaller end for making rigid hermetical connection between said cylindrical body and the metallic sheath of the cable when applied to place. Such connection conveniently consists of a thimble 7 secured at one end to the body 1 as by the screw thread connection 6, and at the opposite end to the metal sheath of the cable as by wiped soldered joint 8. The screw connection between thimble 7 and body 1 should be protected by an overhanging portion of the body 1, and this overhanging portion is preferably inclined downwardly, the position of the entire structure being, as will be understood, vertical, and the smaller end of the orifice through body 1 through which the cable is introduced being preferably the lower end. The opposite upper end of the orifice through the body portion 1 is closed by a cap 4 and this cap 4 is preferably provided at its edge with a leakage-preventing petticoat 5. The conductors forming the cable are electrically connected to the leads-out 10, the connection being formed within the cavity of body portion 1. The leads-out extend out through openings formed in the side walls of the body portion, said openings being preferably formed at the inner ends of pockets formed in the exterior face of the body. The inner walls of these pockets should incline downward from their inner ends so as to prevent collection of moisture therein. The lower walls of the pockets preferably extend outward above that portion of the body 1 to which the thimble is connected, forming a petticoat protecting the line of connection of the thimble with the body portion.

It is preferred that the pockets should be formed by a plurality of petticoats extending outwardly and downward above and below the openings for the leads-out, and by a plurality of webs 12 extending radially between adjacent petticoats 3 and 9. At least one such web should be formed between adjacent openings for the leads-out. The particular terminal which I have chosen for purposes of illustration is one which is adapted to the leading out of two conductors, and to that end there are two orifices 11. It will be understood that the number of these lead-out orifices will correspond to the number of conductors to be thus led out. Referring to Fig. 2 it will be seen that while I have two leads-out, and these are preferably arranged at points diametrically opposite one another, I have provided four webs 12, of the nature which I have described, to prevent leakage. Two such webs would be of substantial value in preventing leakage from one lead-out to the other, but four are more effective; for, the structure being exposed to the weather, a storm coming from any quarter and beating in under the petticoat will not be able to establish a continuous moist surface from one lead out to the other, in consequence of this quadrant arrangement of the four webs; and so for greater security in case of a like structure with three leads-out, instead of providing three webs, one between each pair of adjacent lead-out orifices, I preferably provide six webs, two being interposed between each pair of lead-out orifices; and so with larger numbers of leads-out, I preferably employ a correspondingly greater number of webs for the purposes described.

The assembling of this structure will readily be understood. The cable, its end properly prepared and its conductors exposed, is introduced into the chamber within the body 1 and the sheath of the cable secured to the body, as by the thimble 7 and wiped joint 8, to form rigid and hermetically tight contact therewith. The separate conductors within the chamber 2 are electrically united with the leads-out 10, which may conveniently be rubber-coated wires, each filling the lead-out orifices 11 through which it extends. When the connections have thus been made, I preferably fill the entire space within the structure with an insulating substance applied in liquid form, and when the space is filled I complete the structure by applying the cap 4 which seals the whole. The structure then standing in vertical position, each lead-out is protected against leakage, whether over the entire surface of the body 1 or from one orifice to the other, by the means particularly described above.

It will be understood that the body portion 1 is made wholly or substantially of insulating material, and the cap 4 is also preferably made of like material.

It will be observed that the petticoat 9 which protects the screw thread connection 6 between the body 1 and the thimble 7, also serves as a leakage-preventing device between the leads-out and the metallic cable sheath.

I claim herein as my invention:

1. A terminal case or shell for an electrical cable having an opening for the introduction of a cable, and provided with a plurality of lead-out orifices, a petticoat formed on the external surface of said case or shell protecting said lead-out orifices, and a web extending between said petticoat and the adjacent surface of the case or shell separating adjacent lead-out orifices, substantially as described.

2. A terminal case or shell for an electrical cable including in its structure a substantially cylindrical body portion open at one end for the introduction of a cable, an encircling petticoat formed on the external surface of said body portion, a radially disposed web extending between said petticoat and the adjacent surface of said body portion, and lead-out orifices formed in the wall of said body portion adjacent to said petticoat and on either side of said web, substantially as described.

3. A terminal case or shell for an electrical cable including in its structure a substantially cylindrical body portion open at one end for the reception of a cable, an encircling petticoat formed on its external surface, a plurality of lead-out orifices formed in the wall of said body portion adjacent to said petticoat, and a plurality of radially disposed webs separating two adjacent lead-out orifices extending between said petticoat and the adjacent surface of said body portion, substantially as described.

4. A terminal case or shell for an electrical cable consisting of a substantially cylindrical body portion open at its opposite ends and having lead-out orifices in its cylindrical walls, said body portion being further provided externally with a petticoat which when the structure is in normal position overhangs said lead-out orifices, and with a web extending from said petticoat to the adjacent surface of said body portion between two lead-out orifices, and a petticoated cap for one end of said body portion, substantially as described.

5. A three piece terminal for an electric cable consisting of a thimble adapted to be connected hermetically to a cable-sheath, an integral homogeneous casing of insulating material externally petticoated and provided beneath the protection of the petticoat with a plurality of lead-out orifices, and a cap, substantially as described.

In testimony whereof, I have hereunto set my hand.

CHARLES W. DAVIS.

Witnesses:
 CHARLES BARNETT,
 THEODORE DUFF.